United States Patent [19]

Srivastava

[11] Patent Number: 5,230,831
[45] Date of Patent: Jul. 27, 1993

[54] EUROPIUM- AND BISMUTH-DOPED LUMINESCENT COMPOSITIONS

[75] Inventor: Alok M. Srivastava, Schenectady, N.Y.

[73] Assignee: General Electric Company, Schenectady, N.Y.

[21] Appl. No.: 972,349

[22] Filed: Nov. 6, 1992

[51] Int. Cl.$^5$ .............................................. C09K 11/78
[52] U.S. Cl. .............................. 252/301.4 F; 423/263
[58] Field of Search .................. 252/301.4 F; 423/263

[56] References Cited

U.S. PATENT DOCUMENTS

| | | | |
|---|---|---|---|
| 3,640,887 | 2/1972 | Anderson | 252/301.4 F |
| 4,014,812 | 3/1977 | Kelsey et al. | 252/301.4 F |
| 4,153,469 | 5/1979 | Alexandrov et al. | 252/301.4 F |
| 4,295,989 | 10/1981 | Klein et al. | 252/301.4 F |
| 4,980,559 | 12/1990 | Bryan et al. | 252/301.4 F |
| 4,988,880 | 1/1991 | Bryan et al. | 252/301.4 F |

FOREIGN PATENT DOCUMENTS 43-4500  2/1968  Japan .............................. 252/301.4 F

OTHER PUBLICATIONS

Maksimov et al "Soviet Physics-Crystallography" vol. 11, No. 4, Jan. 1967 pp. 583–584.
McCauley et al "J. of Lumin.", 6 (1973), pp. 105–115.
Blasse et al "Mater. Res. Bull.", 19(8), 1984, pp. 1057–1062.
Chimcholkar "Chem. Abstr.", vol. 84, 1976, 82852a.

*Primary Examiner*—Jack Cooper
*Attorney, Agent, or Firm*—William H. Pittman

[57] ABSTRACT

Phosphorescent compositions of the formula $NaY_{1-x}A_xM_2O_6$, wherein A is europium or bismuth, M is zirconium or hafnium and x is in the range of about 0.001–0.25, are prepared by the reaction of appropriate proportions of sodium bicarbonate and the corresponding metal oxides. They have a cubic fluorite-type crystal lattice.

10 Claims, No Drawings

EUROPIUM- AND BISMUTH-DOPED LUMINESCENT COMPOSITIONS

This invention relates to new luminescent compositions of matter, useful as phosphors.

Phosphors are employed in such diverse applications as fluorescent lamps, X-ray detection devices including computerized tomography scanners, digital radiography devices and position emission tomography apparatus. Upon excitation by ultraviolet, X-ray or cathode radiation, they release energy in the form of light which may be easily detected.

For many areas of phosphor utilization, it is desired to have materials of relatively low cost with high atomic number and short primary decay times. A number of phosphors which are expected to satisfy these criteria are provided by the present invention.

The invention includes luminescent crystalline composition having the formula $NaY_{1-x}A_xM_2O_6$, wherein A is europium or bismuth, M is zirconium or hafnium and x is in the range of about 0.001–0.25, said composition having a cubic fluorite-type crystal lattice.

As will be apparent from the above generic formula, the composition of this invention are europium-or bismuth-doped mixed sodium, yttrium and zirconium or hafnium oxides. They may be prepared by the fraction of stoichiometric amount of $NaHCO_3$, $MO_2$ or $A_2O_3$. The reaction takes place upon firing at temperatures of about 1000° C. or greater.

The preparation of the compositions of this invention is illustrated by the following examples.

EXAMPLE 1

A mixture of sodium bicarbonate, zirconium(IV) oxide, yttrium(III) oxide and europium(III) oxide, corresponding to a Na:Y:Eu:Zr molar ratio of 1000:995:5:2000, was ball milled for 2 hours and heated at 1000° C. for 2 hours to decompose the sodium bicarbonate. It was then again ball milled and heated to 1300° C. for 10 hours. X-ray diffraction confirmed the formation of a single phase material with a cubic fluorite-type crystal lattice. The lattice constant was 5.163Å and the calculated density was 4.71 g./cm.$^3$.

EXAMPLES 2-4

The procedure of Example 1 was repeated, varying the molar ratios of yttrium and europium as follows:
Example 2—Y, 950; Eu 50;
Example 3—Y, 900; Eu 100;
Example 4—Y, 800; Eu 200;
Similar products were obtained.

Upon excitation by ultraviolet radiation at 254 nm., the product of Example 2 luminesced with four peaks at 590, 605 and 630 nm (orange region of the visible spectrum).

EXAMPLE 5

The procedure of Example 2 was repeated, substituting bismuth(III) oxide on an equimolar basis for the europium(III) oxide. A similar product was obtained.

Upon excitation by ultraviolet radiation at 254 nm., the product of Example 5 luminesced at 440 nm. (violet region of the visible spectrum).

EXAMPLE 6

The procedure of Example 2 is repeated, substituting hafnium(IV) oxide on an equimolar basis for the zirconium(IV) oxide. A similar product is obtained.

The compositions of this invention are useful are phosphors in numerous types of lighting structures, medical diagnostic structures and the like, including those enumerated hereinabove. Accordingly, phosphorescent articles may be produced by depositing such a compounds on a substantially chemically inert support. Said support may be, for example, a material which is also inert to radiation (i.e., a glass envelope in the case of a fluorescent lamp fixture). In the case of a medical imaging apparatus, it may be a light sensing unit such as a photodiode, photomultiplier device or charge-coupled device.

What is claimed is:

1. A luminescent crystalline composition having the formula $NaY_{1-x}A_xM_2O_6$, wherein A is europium or bismuth, M is zirconium or hafnium and x is in the range of about 0.001–0.25, said composition having a cubic fluorite-type crystal lattice.

2. A composition according to claim 1 wherein M is zirconium.

3. A composition according to claim 2 wherein A is europium.

4. A composition according to claim 3 wherein x is 0.005.

5. A composition according to claim 3 wherein x is 0.05.

6. A composition according to claim 3 wherein x is 0.1.

7. A composition according to claim 3 wherein x is 0.2.

8. A composition according to claim 2 wherein A is bismuth.

9. A composition according to claim 8 wherein x is 0.05.

10. A composition according to claim 1 wherein M is hafnium.

* * * * *